Figure 1:
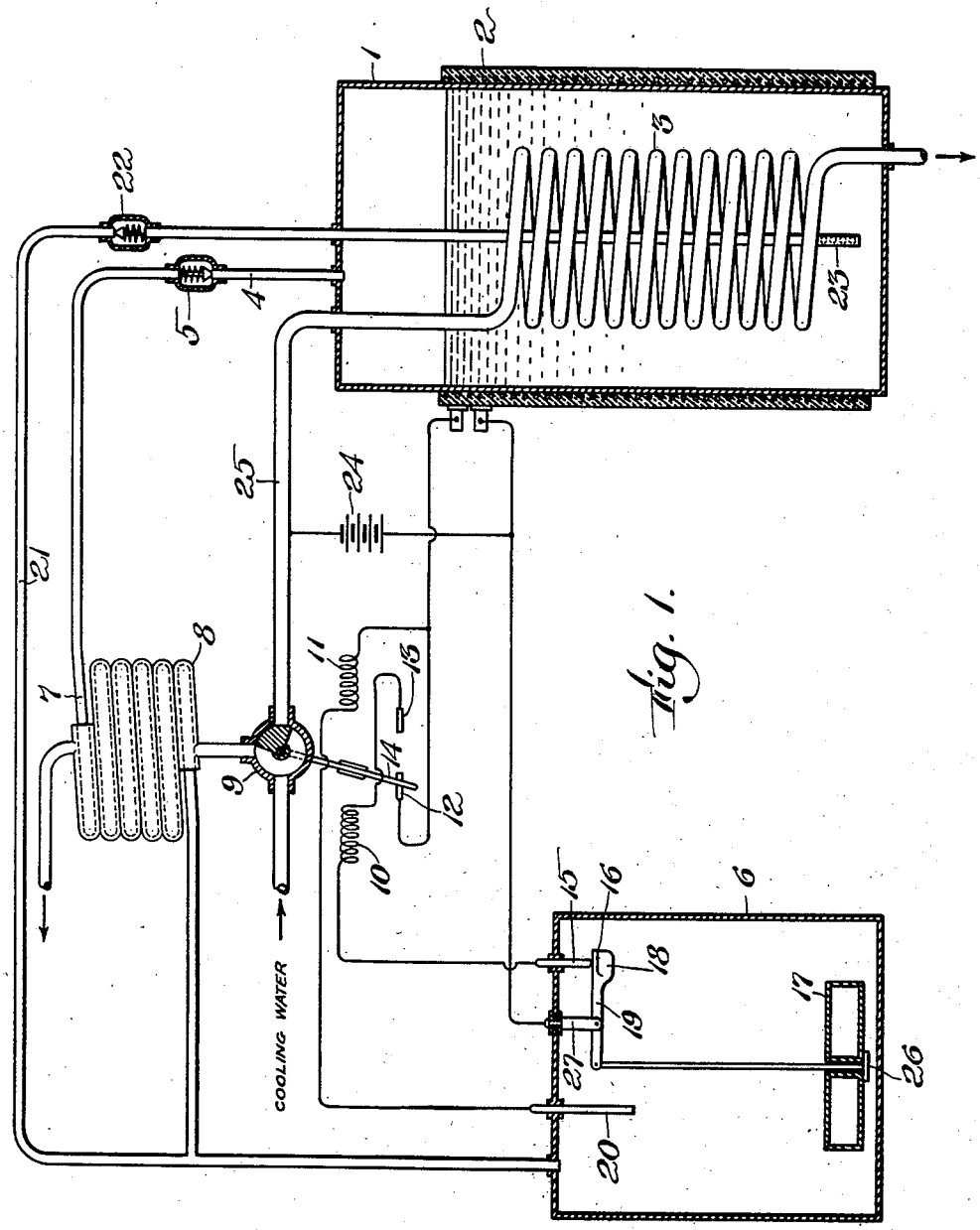

F. G. KEYES.
METHOD OF REFRIGERATION.
APPLICATION FILED JAN. 27, 1917.

1,258,017.

Patented Mar. 5, 1918.
2 SHEETS—SHEET 1.

Inventor:
Frederick G. Keyes,
by Kerr, Page, Cooper & Hayward
Attorneys.

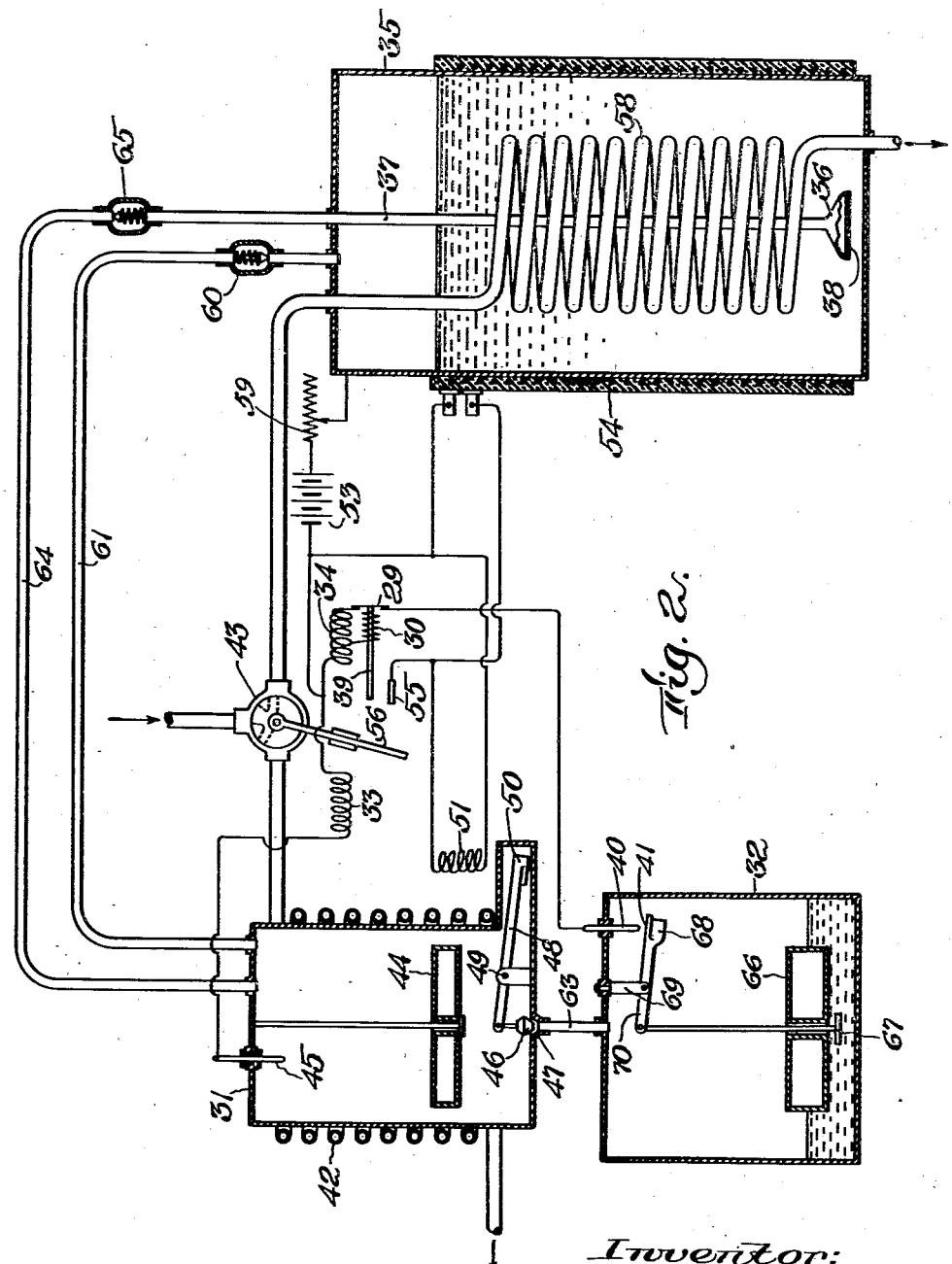

UNITED STATES PATENT OFFICE.

FREDERICK G. KEYES, OF BOSTON, MASSACHUSETTS, ASSIGNOR TO NATIONAL AUTOMATIC REFRIGERATOR COMPANY, A CORPORATION OF NEW JERSEY.

METHOD OF REFRIGERATION.

1,258,017.      Specification of Letters Patent.      Patented Mar. 5, 1918.

Application filed January 27, 1917. Serial No. 144,835.

*To all whom it may concern:*

Be it known that I, FREDERICK G. KEYES, a citizen of the United States, residing at Boston, Suffolk county, State of Massachusetts, have invented certain new and useful Improvements in Methods of Refrigeration, of which the following is a full, clear, and exact description.

This invention relates to refrigeration, and more particularly to automatic refrigeration wherein is employed a composition comprising an absorbent, a solvent, and a refrigerant, for example, ammonium nitrate, water and ammonia.

The subject matter of invention herein claimed consists of a refrigeration process; this process is illustrated in association with a new refrigerating composition invented by me, which is described and claimed in my application for United States Letters Patent, filed May 27, 1916, Serial No. 100,379, and also with a new refrigerating apparatus invented by me, which is the subject matter of claims in an application for United States Letters Patent filed by me concurrently herewith, Serial No. 144,834.

It has been proposed to produce automatic refrigeration by a process involving the use of two liquids comprising a solvent and a refrigerant such as water and ammonia which have, at the same temperature, widely different vapor pressures. The operation of such a system may be conceived with referenc to simple apparatus comprising a distilling chamber, a rectifying chamber, a condensing chamber, and a refrigerating chamber, arranged to alternately perform distilling and refrigerating operations. During the first stage the distilling chamber is heated to vaporize a component of the bi-liquid comprising ammonia and some water. The water, having the lower vapor pressure, is condensed in the rectifier and returned to the distilling chamber. The ammonia vapor passes on to the condensing chamber where it is liquefied and caused to flow into the storage tank. During the refrigerating stage the distilling chamber is cooled and the ammonia is allowed to escape through an expansion valve into the refrigerating coils. The ammonia then returns to the distilling chamber where it is absorbed by the component of the bi-liquid remaining therein.

There are numerous objections to the bi-liquid system, one of which is due to the vaporization of some of the solvent along with the refrigerant during the distillation stage which necessitates an intermediate condensing chamber to condense the solvent to prevent its passing on to the storage tank. This involves the use of a motor, gravity mechanism, or other means for conveying the liquid condensed in the intermediate chamber back to the first chamber. Furthermore, it is difficult to control the operation of a bi-liquid system in such a way as to abstract all of the liquid having the lower vapor pressure from the component driven off from the still during the distillation stage, and in practice some of this liquid is liable to pass over to the storage chamber along with the refrigerant. There it accumulates, and unless removed by some special means it is likely to freeze and burst the expansion coils.

It has also been proposed to employ a salt-liquid, that is, a solution of a salt in a liquid, and to employ only two principal chambers, one of which is arranged to be alternately heated and cooled and the other of which may serve as the refrigeration chamber. The principal advantage of using a salt is that the dissolution thereof in the refrigerant brings about a large reduction of the vapor pressure of the refrigerant, and in the case of concentrated solutions this reduction of vapor pressure is extraordinarily large.

The salt-liquid system of refrigeration has proven unsatisfactory in practice, however, chiefly for the reason that it presents the following dilemma: If only sufficient liquid is employed to dissolve the salt the latter precipitates upon distilling all or a part of the liquid from the first chamber into the second chamber; and during the refrigeration period, when the liquid vaporizes and returns in vapor form to the first chamber to be reabsorbed by the salt, the absorption takes place very slowly owing to the fact that the salt, having been precipitated, exists in the solid state. Even after a portion of the salt has been dissolved the absorption takes place slowly owing to the fact that the superficial layer of solution formed over the surfaces of the crystals diffuses with great slowness into the more dilute portions of the mixture, thus hindering rapid absorption of the vapor. On the other hand, if more liquid is employed than is required to dissolve the salt, and if only a portion of the liquid is distilled off, leaving enough in the first chamber to maintain all the salt dissolved, the difference in vapor pressure between the liquid distilled over into the second chamber and the comparatively dilute solution left in the first chamber is so small that the system is inefficient for the well-known reason that a large difference in vapor pressure between the liquids in the two chambers is essential to secure rapid absorption of the refrigerant and thus give efficient and rapid refrigeration. In either event the solution is very viscous, and a mechanical stirrer is ordinarily necessary, thus adding materially to the cost of operation and also involving the use of troublesome packing glands.

Thus, on the one hand a bi-liquid system involves a difficulty due to the necessity of freeing the evolved refrigerating fluid from the less volatile constituent, and on the other hand the use of a very soluble salt leads to difficulties due to the slowness with which the refrigerating liquid evolved from the solution is reabsorbed by the solid salt.

It is the object of my invention to overcome the above difficulties and to provide simple and efficient refrigeration which is well adapted for continuous and automatic use. For this purpose I preferably employ a ternary solution, consisting of three constituent parts, namely, an absorbent, a solvent and a refrigerant, in which the refrigerant may be soluble in the solvent as well as in the absorbent. The particular composition which I preferably employ comprises ammonium nitrate, water and ammonia.

It is a well-known fact that any salt dissolved in a solvent reduces the vapor pressure of the solvent, but the law relating to the relative vapor pressures of solutions of different concentrations is known only for very dilute solutions. The differential equations expressing these laws have been integrated for dilute solutions only, and for concentrated solutions it is necessary experimentally to determine which salts possess the property of abnormally lowering the vapor pressures of solvents in which they may be dissolved. When ammonium nitrate is dissolved in liquid ammonia, the lowering of the vapor pressure of the solvent may properly be described as abnormal since it is far greater than would be predicted from the law which holds true for dilute solutions. Moreover, ammonium nitrate is very soluble in ammonia, which is a further desideratum for the purpose of my invention. Thus a very large proportion of the ammonia may be distilled off from my ternary composition without causing a precipitation of any of the ammonium nitrate, at the same time leaving in the first chamber a highly concentrated solution of the nitrate having a much lower vapor pressure than the practically anhydrous ammonia distilled over into the refrigerating chamber. Furthermore, ammonium nitrate is a salt which lowers the vapor pressure of water without diminishing the solubility of ammonia in the mixture; indeed, the presence of the water increases the solubility of ammonia in the mixture.

It is also a well-known fact that with few exceptions a composition exists for a pair of liquids, which has a critical proportion of the two liquids, such that the boiling point of the mixture is unique in that the composition remains unchanged upon distillation at a given temperature. Thus, when a solution having the critical proportion of two liquids is boiled, the gas given off has the same proportion of constituents as the liquid. For example, water and alcohol in the critical proportion form a mixture which, when distilled at a pressure of one atmosphere, passes from the still to the condenser without change of proportion. Owing to the fact that the vapor evolved from the liquid has the same proportion of constituents as the liquid, separation of the two components of the mixture by a process of distillation is physically impossible. In this example the critical mixture comprises water and alcohol approximately in the ratio of one to twenty-three.

I propose to utilize this principle by employing the water and ammonia, or other equivalent solvent and refrigerant, in such proportions that upon heating the ternary solution in the distillation chamber to a suitable temperature, for example to a temperature of the order of 100° C., the ammonia and water will distil over into the refrigeration chamber either in such relative quantities that, at the temperature of the refrigeration chamber, the aforesaid critical proportion will be obtained therein, or in such relative quantities that an excess of refrigerant over the amount required to comprise the critical proportion will exist therein. If an excess of refrigerant passes over, substantially pure refrigerant will evaporate until only a sufficient amount thereof is left to comprise, with the solvent, the critical proportion; and the solvent will then begin to pass off with the refrigerant as a mixture having the said critical proportion. Thus, residual separation of solvent in the refrigeration chamber is impossible, and no solvent will be left behind to accumulate and freeze therein. When employing water and ammonia as the solvent and refrigerant, respectively, and when operating at a temperature of approximately 0° C. in the refrigeration chamber, the aforesaid critical proportion is roughly twenty parts ammonia to one part of water.

Thus it will be seen that the water or other solvent employed has several important functions. In the first place, the solution in the first chamber remains in liquid form during and after the distillation of a large proportion of the anhydrous ammonia, and no salt is precipitated, thus eliminating the objectionable results incident to a precipitation of a salt in the distilling chamber. Moreover, the diminished viscosity of the solution in the distilling chamber, due to the presence of the water remaining after distilling off the most of the ammonia and a very small amount of the water, allows a more rapid diffusion and reabsorption of the refrigerant as it returns from the refrigerating chamber.

I therefore contemplate employing water in quantity sufficient to maintain the ammonium nitrate in solution after substantially all the ammonia and a very little of the water has been distilled therefrom, and in quantity not greater than is sufficient to comprise the critical proportion thereof with ammonia in the refrigerating chamber under the desired conditions of temperature and pressure therein during the refrigeration process. When a temperature of the order of 100° C. is employed in the distilling chamber during the distillation process a larger ratio of water to ammonia than one to twenty (substantially the critical ratio at 0° C.) may be employed, inasmuch as the vapor pressure of the water in the ternary solution is lowered to such an extent by the ammonium nitrate that less than the critical proportion of water is distilled off at a temperature of the order of 100° C. even when employing water and ammonia in the ternary composition in the ratio of one to seven, a suitable ratio under ordinary conditions as will now appear.

When employing a temperature of the order of 100° C. in the absorption chamber during the distillation stage and a temperature of the order of 0° C. in the refrigeration chamber, a suitable proportion of the three elements of my preferred composition comprises approximately forty per cent. ammonia, five per cent. water and fifty-five per cent. ammonium nitrate. It is to be understood that this particular mixture is merely an example of suitable proportions of materials which may be employed under the conditions mentioned and that the invention is in no way limited to these particular proportions.

Although I preferably employ a composition comprising ammonium nitrate, water and ammonia, combined in the proportions above set forth, there are other materials which will coöperate in the functional relationship hereinbefore described, and compositions comprising such materials I consider the equivalents of ammonium nitrate, water and ammonia. For example, thiocynate of ammonia may be employed in lieu of nitrate of ammonia. Furthermore, either the absorbent, the solvent or the refrigerant may consist of two or more combined materials or additional materials may be added, within the scope of my invention, so long as the described functional relationship exists between the various materials.

In the accompanying drawing,—

Figure 1 is a diagram of one embodiment of apparatus for producing refrigeration according to my invention; and Fig. 2 is a diagram of another embodiment of my improved apparatus.

Referring to Fig. 1, the distillation chamber 1 is arranged to contain my ternary compositions above described, and is surrounded by an electric coil 2 employed for heating the chamber during the distillation period. The coil 3 contained within the chamber is provided to cool the composition during the refrigeration period. When the solution within chamber 1 is heated the vapor passes by way of pipe 4 through check valve 5, which allows passage of gas only in this direction, and thence into the condenser 7—8, where the vapor is reduced to a liquid which flows into the refrigerating chamber 6.

The condenser comprises an inner coil of pipe 7 for conducting the refrigerating fluid, and an outer coil of piping 8 supplied with cooling water. A valve 9 is provided to permit water to flow into the coil 8 when in the position shown in the drawing, and when in the alternate position it is arranged to cut off the supply of water from the coil 8 and to permit a comparatively small amount of water to flow through the coil 3 in chamber 1. The valve 9 is controlled by two electromagnets 10 and 11 which also control contacts 12 and 13 arranged to make sliding contact with the conducting arm 14 of the valve. The circuit of electromagnet 10 is controlled by a switch comprising two contacts 15 and 16 within the chamber 6, and the switch is controlled by the weight of float 17 and a counterbalancing weight 18 on the pivot arm 19.

The circuit of electromagnet 11 is controlled by a switch comprising electrode 20 coöperating with the conducting float 17. Each of the three electrodes projecting through the chamber 6 is insulated from the chamber by means of an insulating bushing as illustrated. A pipe 21 containing a check valve 22 forms a passage for vapor passing from the refrigerating chamber to the distilling chamber. This passage is continued within the distilling chamber to a point near the bottom of the chamber and is there provided with a device for causing the vapor to pass into the absorbent in fine streams. Suitable means for this purpose may comprise the perforated portion 23 of the extension pipe 21.

At the beginning of the operation of the system the refrigeration chamber 6 is empty, and all of the composition is in the distillation chamber 1 as shown in the drawing. The valve arm 14 is placed in the position shown in the drawing, opening a passage from the source of cooling water to the condenser 7—8 and closing the following circuit through the heating coil 2: contact 12, heating coil 2, battery 24, pipe 25, valve 9 and arm 14. The refrigerating component is vaporized, passes to the condenser 7—8, is liquefied, and flows into the refrigeration chamber 6. This stage of the process continues until the refrigeration chamber 6 is filled to such extent that the float 17 makes contact with the electrode 20. The electromagnet 11 is then energized over the following circuit: electrode 20, electromagnet 11, contact 12, arm 14, pipe 25, battery 24, electrode 27 and float 17, throwing the arm 14 to the right-hand position. The cooling water is cut off from the condenser and diverted to the cooling coil 3 in the chamber 1; and the circuit of the heating coil is opened at the contacts 12—14. The chamber 1 is quickly cooled, thus reducing the vapor pressure of the solution therein to a value much lower than that of the vapor pressure of the refrigerant in chamber 6. The refrigerant begins to vaporize and pass back through pipe 21 and check valve 22 to the perforate device 23, where it is divided into fine streams and allowed to pass out into the liquid in chamber 1 where it is absorbed. This stage of the process continues until substantially all of the refrigerant in refrigeration chamber 6 has vaporized and passed back into distillation chamber 1, or until the weight of float 17 rests on the stop 26 and overcomes the weight of the counterbalance 18. The switch 15—16 is then closed, energizing the electromagnet 10 which moves the arm 14 into the left-hand position. The cooling water is diverted from coil 3 into coil 8, and the circuit for the heating coil 2 is again closed. The first stage in the process is then repeated and the process thus continues automatically.

It will be noted that upon the energization of either electromagnet the circuit therethrough is opened at the contact coöperating with the opposite side of the valve arm. Thus, when the valve arm is thrown to the right-hand position by the energization of electromagnet 11 the circuit through the electromagnet is thereupon opened at contact 12. With this arrangement some economy in current consumption is effected owing to the fact that the circuits are not closed during the relatively long periods required for the float controlled switches to be opened by the slow rise or fall of the liquid level in the refrigeration chamber. It will be understood that each electromagnet may be so designed as to have sufficient residual magnetism to completely operate the valve arm after the circuit therethrough has been opened, especially in view of the fact that the initial inertia and friction of the valve and arm is overcome before the circuit is opened. It will be further understood that the electrical contacts and circuit arrangements are merely illustrative and that other contacts and other circuit arrangements may be employed if desired.

The modified form of my invention shown in Fig. 2 is essentially the same as that shown in Fig. 1, the principal difference being that, in lieu of the condenser 7—8 in Fig. 1, a separate chamber 31 is provided to condense and collect the refrigerant before it is introduced into the refrigeration chamber 32 corresponding to chamber 6 in Fig. 1. It will also be noted that the circuit of the electromagnet 33 in Fig. 2 is not controlled by contacts coöperating with the valve arm, although it is obvious that the circuit might be so controlled, if desired. When the valve arm is thrown to the right the circuit of electromagnet 34 is arranged to be opened at contacts 29 by means of a plunger 39 of insulation material. Suitable means may be provided to close the contacts 29 when the valve arm is moved to the left as, for example, a weak tension spring 30.

The advantage in providing a separate chamber where the refrigerant component is condensed and collected before passing to the refrigerating chamber, is due to the fact that an ordinary condenser, as in Fig. 1, will not wholly condense the refrigerant under all conditions, in which event the refrigerant passes into the refrigerating chamber partially in gaseous form so that the heat of condensation of this gaseous portion is liberated in the refrigeration chamber, whereas with a separate condensing chamber as shown in Fig. 2 the refrigerant is wholly liquefied in the condensing chamber, thus avoiding the liberation of any heat of condensation in the refrigeration chamber. It will, of course, be understood that the condensing chamber is placed on the outside of the refrigerating compartment containing the refrigerating chamber.

The distillation chamber 35 in Fig. 2 may be identical with the distillation chamber in Fig. 1. However, I have shown a modified form of means for admitting the refrigerant into the mixture in chamber 35 for readsorption. This modified means comprises an enlargement 36 on the end of pipe 37, the enlarged opening of which is covered with a perforate member 38, whereby the gas issuing from the pipe 37 into the chamber 35 is broken up into fine streams so as to be more readily absorbed. The refrigeration chamber 32 differs from refrigeration chamber 6 shown in Fig. 1, in that only one pair of contacts 40 and 41 are controlled by the float therein.

The condensing chamber 31 comprises a cooling coil 42 surrounding the chamber and adapted to be supplied with cooling water when the valve 43 is in the alternate position from that shown in the drawings. A float 44 is provided in the chamber to engage an electrode 45 when the chamber is substantially filled with liquid to energize the electromagnet 33. A valve 46 coöperating with the valve seat 47 in the bottom of the condensing chamber is mounted on an arm 48 which is pivotally supported at 49. The arm 48 has a counterbalance 50 on the end thereof opposite from the end supporting the valve whereby the valve is normally maintained open. An electromagnet 51 is provided to attract the weighted end of the arm 48 to close the valve 46. The electromagnet 51 is connected on one side to the battery 53 in parallel with the heating coil 54 surrounding chamber 35, and is connected on the other side to the contact 55 arranged to engage the valve arm 56 when the latter is moved into alternate position by electromagnet 34.

The operation of the modified system shown in Fig. 2 is as follows: The arm 56 is moved into the right-hand position cutting off the water supply from the coil 58 in the distillation chamber and opening the passage from the water inlet to the cooling coil 42 surrounding the condensing chamber 31. The arm 56 in this position also opens the circuit through electromagnet 34 at 29 and closes parallel circuits for electromagnet 51 and heating coil 54 as follows: contact 55, electromagnet 51 and heating coil 54 in parallel, battery 53, control resistance 59, to the grounded portion of the system, and thence through valve 43 and arm 56 back to the contact 55. The distillation stage of my process then begins, and the refrigerant along with some of the solvent in chamber 35 is distilled over into the condensing chamber 31 through check valve 60 and pipe 61.

During this stage of the process the electromagnet 51 maintains the valve 46 closed causing the condensed refrigerant component to collect in chamber 31. After the chamber has become filled to such an extent that the float 44 contacts with electrode 45 the circuit is closed for the electromagnet 33 over the following circuit: contact 45, electromagnet 33, battery 53, control resistance 59 to the grounded portion of the system, and thence to the grounded chamber 31, float 44, back to the contact 45. The electromagnet 33 diverts the cooling water from coil 42 to coil 58 and opens the circuit of the electromagnet 51 and heating coil 54 at contact 55. The valve 46 is then opened permitting the refrigerant component collected in chamber 31 to flow into the refrigerating chamber 32. Owing to the fact that heating current is cut off from coil 54 and cooling water is supplied to coil 58, the distillation chamber is rapidly cooled and the refrigerant component in refrigeration chamber 32 soon begins to vaporize and pass back through pipe 63, chamber 31, pipe 64, check valve 65, pipe 37, the perforate device 38, into the absorbent solution left in the chamber 35 at the end of the distillation period.

This stage of the process continues, producing a refrigerating effect about the chamber 32 until the refrigerant component is substantially all transferred back to the chamber 35, at which time the float 66 engages a stop 67 and the weight of float 66 overcomes the weight of counterbalance 68 and closes contacts 40, 41. This closes a circuit through electromagnet 34 over the following circuit: contact 40, electromagnet 34, battery 53, control resistance 59 to the grounded portion of the system, and thence to the chamber 32, support 69, arm 70, contact 41, back to electrode contact 40. Electromagnet 34 moves the valve arm 56 into right-hand position, diverting the cooling water from coil 58 to coil 42, and closing contact 51 to complete the circuit through electromagnet 51 and heating coil 54 at contact 55. The circuit for electromagnet 34 is opened by the valve arm in its movement to the right by means of plunger 39 and switch 29 to prevent current from flowing through the electromagnet 34 during the distillation period. Thus, the distillation and refrigeration processes continue to alternate automatically in the manner described.

By way of summary it may be noted that the various elements of the ternary solution should be combined in proportions such that during the distillation period no more of the solvent will pass off with the refrigerant than is sufficient to comprise the critical mixture above referred to and preferably such that less than this amount of solvent will vaporize with the refrigerant. This result can readily be attained when using water and ammonia owing to the fact that the boiling points of these two liquids differ widely, being respectively 100° C. and −33° C. at one atmosphere pressure. Thus the greater part of the water will remain behind with the ammonium nitrate in the distillation chamber during the distilling stage and prevent precipitation of the solid salt. Of course, a small quantity of water will pass over into the refrigerating chamber with the ammonia, but on account of the infinite miscibility of ammonia in water it is possible so to adjust the quantity of water that when the partition of a small amount of water from the ammonium nitrate takes place, say near the end of the distillation period, the water remaining in the distillation chamber keeps the salt in solution and the amount of water carried over into the refrigerating chamber is so small that no precipitation of the ammonium nitrate takes place.

As already mentioned, the amount of solvent employed in the ternary solution depends upon the temperature which it is desired to maintain in and about the refrigerating chamber. The lower this temperature is, the less is the amount of solvent which should be employed to dissolve the solid absorbent salt. And the ternary solution should not be heated to too high a temperature during the distillation period. With a given maximum temperature of the distillation chamber during the distilling stage, and a given minimum temperature of the refrigerating chamber, it is possible to select the proportions of elements in the ternary solution whereby salt will not be precipitated upon the distillation of substantially all of the refrigerant therefrom, and whereby the solvent will not pass to the refrigerating chamber in quantities greater than is sufficient to comprise with the ammonia the aforesaid critical mixture ratio.

It may also be observed that if the system is to operate over a considerable variation of temperatures, the salt should be very soluble in the solvent. This is in effect the condition with ammonium nitrate, and therefore this condition is also provided for in my mixture. Water to the extent of one-tenth the weight of the nitrate is scarcely too much even when a temperature of the order of $-18°$ C. is attained on the refrigerating side. Of course, some ammonia always remains behind along with the nitrate, and the presence of this ammonia appears greatly to decrease the tendency of the nitrate to precipitate.

It will be observed that two distinct forms of apparatus are shown and described herein. In the first form which represents a simple system there are used a still, a condensing coil and refrigerating cylinder. Now, while it might seem that since the tap water is always warmer than the refrigerator after the first cycle, the condenser will cease to function as a condenser, because the refrigerator cylinder is the coolest point. This is true, but if the refrigerator cylinder is of poor heat conducting material and the condenser is so arranged as to permit almost instantaneous heat interchange, a little ammonia will condense in the refrigerating cylinder at first and this will warm up the walls and thus the pressure will rise until the condenser does the condensing. Such an effect is enhanced if the ammonia water mixture is distilled over very quickly.

I claim:

1. A method of refrigeration with a ternary composition, two components of which have different boiling points, comprising distilling the two components into a refrigerating chamber, and causing the components to vaporize in substantially the same proportions existent in the liquefied form and to be reabsorbed by said composition.

2. A method of refrigeration with a composition comprising water and ammonia, consisting in distilling the water and ammonia into a refrigerating chamber in proportions not greater than the critical boiling proportion and causing the water and ammonia to vaporize substantially in the critical proportion and be reabsorbed by the composition.

3. A method of refrigeration, with a composition comprising ammonium nitrate, water and ammonia, comprising distilling the water and ammonia in substantially a critical boiling proportion from the composition into a refrigerating chamber, and causing the water and ammonia to rapidly vaporize in the same proportion and be reabsorbed by the absorbent.

4. A method of refrigeration, with a composition having a plurality of components, one of which comprises a solvent and a refrigerant combined in substantially a critical boiling proportion, consisting in distilling the one component into a refrigerating chamber, and causing the component to vaporize in the said proportion and be absorbed by the composition.

5. A method of refrigeration, with a composition comprising an absorbent, a solvent and a refrigerant, comprising distilling from the composition into a refrigerating chamber the solvent and the refrigerant in proportions comprising substantially a critical boiling mixture, and causing said mixture to vaporize in the refrigerating chamber in the critical proportion and be reabsorbed by the absorbent.

In testimony whereof I hereunto affix my signature.

FREDERICK G. KEYES.